United States Patent
Higby

[11] Patent Number: 5,858,249
[45] Date of Patent: Jan. 12, 1999

[54] ELECTROCHEMICAL INSOLUBILIZATION OF ANIONIC ARSENIC METHOD AND APPARATUS

[76] Inventor: Loren P. Higby, 6100 S. Stratler, Murray, Utah 84107

[21] Appl. No.: 922,074

[22] Filed: Sep. 2, 1997

Related U.S. Application Data

[60] Provisional application No. 60/038,648 Feb. 21, 1997.

[51] Int. Cl.$^6$ .................................................. B01D 17/00
[52] U.S. Cl. ........................................... 210/748; 210/911
[58] Field of Search ..................................... 210/748, 911

[56] References Cited

U.S. PATENT DOCUMENTS 3,989,608  11/1976  DeMonbrun et al. ................... 204/149
4,011,151  3/1977  Ito et al. .................................. 204/149
4,692,228  9/1987  Twardowski ............................ 204/108

Primary Examiner—Jay H. Woo
Assistant Examiner—Betsey J. Morrison
Attorney, Agent, or Firm—Kirton & McConkie

[57] ABSTRACT

A continuous electrochemical processing method and apparatus for electrochemically removing arsenic contaminants from contaminated aqueous solutions comprising: a) identifying the ion(s) to be removed and their oxidation state, b) identifying the pH of the solution, c) constructing an electrolytic cell with a corroding iron anode and an inert cathode surrounding a reaction zone therebetween into which the contaminated solutions are passed, d) applying the required electromotive force to precipitate the desired ionic species, and e) physically removing the precipitates from the aqueous solution.

10 Claims, 2 Drawing Sheets

CHEMICAL REACTIONS $HAsO_4^{-2} + OH^- = AsO_4^{-3} + H_2O$
$Fe^{+3} + AsO_4^{-3} = FeAsO_4 \text{ (s)}$
$2Fe^{+3} + AsO_4^{-2} + H_2O = 2Fe^{+2} + H_2AsO_4^-$
$H_3O^+ + OH^- = 2H_2O$ Half Cell Reaction (Aerated Water)
$O_2 + 2H_2O + 4e^- = 4OH^-$  $E_o = 0.4$ eV

CHEMICAL REACTIONS $HAsO_4^{-2} + OH^- = AsO_4^{-3} + H_2O$
$Fe^{+3} + AsO_4^{-3} = FeAsO_4 (s)$
$2Fe^{+3} + AsO_4^{-2} + H_2O = 2Fe^{+2} + H_2AsO_4^-$
$H_3O^+ + OH^- = 2H_2O$

CHEMICAL REACTIONS
$OH^- + H_3O^+ = 2H_2O$

ELECTROCHEMICAL INSOLUBILIZATION OF ANIONIC ARSENIC METHOD AND APPARATUS

RELATED APPLICATIONS

This application is a continuation-in-part of Provisional Application No. 60/038,648 filed Feb. 21, 1997 entitled "Electrochemical insolubilization of Arsenates/Arsenites and Other Ionic Compounds".

BACKGROUND OF THE INVENTION

1. Field

This invention pertains to removal methods for arsenic contaminants from neutral drinking waters. More particularly it provides an electrochemical insolubilization method and apparatus for the removal of arsenic contaminants from neutral drinking waters.

2. State of the Art

Various removal methods of heavy metal ions from aqueous solutions are known. For example, Bouard et al, U.S. Pat. No. 5,425,857 disclose a process and device for the electrolytic generation of arsine. Brewster, U.S. Pat. No. 5,368,703 discloses a process and apparatus for removing arsenic from aqueous media utilizing ferrous ion provided by an electrochemical cell which is added to the aqueous media in a first step, followed by a second step of mild oxidizing conditions generated by the addition of hydrogen peroxide (Fentons Reagent). The ferrous ion then forms a hydroxide that is oxidized to an oxyferric oxide and the arsenic present at a +3 oxidation state is oxidized to a +5 oxidation state. A precipitate is formed which consists of hydroxy ferric oxide to which the arsenic oxyacid is adsorbed (co-precipitated).

O'Connor et al., U.S. Pat. No. 5,182,023 discloses a process for treating arsenic-containing aqueous waste using ultra filters to remove solids. It is followed by a chemical treatment to adjust the pH range from about 6 to 8. Then, antiscalents and antifouling material are added. The chemically treated filtrate is then subjected to a reverse osmosis process to result in a permeate stream having less than about 50 parts per billion arsenic.

Gallup, U.S. Pat. No. 5,024,769 discloses a method of treating an aqueous solution containing one or more arsenic compounds in a +3 oxidation state. The method comprises contacting the aqueous solution with a halogenated organic oxidizing agent to convert the +3 arsenic to a +5 oxidation state.

McClintock, U.S. Pat. No. 5,358,643 discloses a treatment method for removing arsenic from water via conditioning the water with one or more additives including an iron salt, an acid, and an oxidant until the water contains more ion than arsenic, is acidic, and has an oxidation-reduction potential of about plus 600 mV. A reagent is then added to the conditioned water until it becomes basic and the water and additives are then reacted in a reaction chamber wherein iron and arsenic are coprecipitated in the form of iron arsenate and iron hydroxide or iron oxide. The treated water is then separated from the precipitate by settling or filtering.

In the article entitled "Use of Electrochemical Iron Generation for Removing Heavy Metals from Contaminated Groundwater" by M. D. Brewster and R. J. Passmore published in the *Environmental Progress* (Vol. 13, No2) May, 1994 at page 143, the authors discuss an electrochemical iron addition process developed by Andco Environmental Processes, Inc. The process employs electric current and steel electrodes to put ferrous and hydroxyl ions into solution. Once added, the chemistry is manipulated with the addition of various ions to provide coprecipitation and adsorption conditions capable of simultaneously removing a wide variety of heavy metals. For example, hydrogen peroxide was introduced to convert Fe+2 to Fe+3, and arsenite to arsenate. The pH was then adjusted to precipitate and adsorb various heavy metal oxides.

The method described below provides a continuous processing method to remove ions from an aqueous solution by: a) identifying the ion(s) to be removed and their oxidation state, b) identifying the pH of the solution, c) constructing an electrolytic cell with a corroding anode and an inert cathode surrounding a reaction zone therebetween, and d) utilizing an iron anode to electrochemically precipitate the desired ionic specie for physical removal of the precipitates from the aqueous solution. The method avoids the need for additional reagents and the removal problems associated therewith. It also reduces the ion concentration left in the treated aqueous significantly less than the other methods described above.

SUMMARY OF THE INVENTION

The object of this invention is to provide an electrochemical method for the treatment of aqueous solutions contaminated with arsenic. This is accomplished utilizing an electrolytic cell with an anode and cathode surrounding a reaction zone. The external electron moving force and the inherent electrostatic forces associated with the charged electrodes act to selectively precipitate desired ionic species for physical separation.

In electrolytically treated neutral aqueous-systems, such as drinking waters, ionic substances are transported to their respective poles by the following different modes: convection, diffusion, migration, or by a combination of these three modes. The focus of this invention is to capitalize on all three modes.

Soluble arsenic species can be removed from an aqueous system having a neutral pH by the deliberate corrosion of an iron anode by arsenic oxidation and precipitation at the acidic layer of the diffusion layer of the corroding anode. Cells with sufficient potentials and current will cause an iron anode to continually corrode. This corrosion process forms an adsorbed acid layer on the surface of the anode. This acidic layer consists of adsorbed $Fe^{+3}$ cations (adions). As the arsenic anions of neutral waters migrate toward the anode to be discharged, they encounter this adsorbed acid interface. At this interface two chemical pathways leading to insolubilization of arsenic are followed. The first and most direct is the simple complexation of ferric cations with the completely oxidized complex anions of arsenic. Resulting anodic product being ferric arsenate.

$$Fe^{+3}+AsO_4=FeAsO_4(solid)$$

The second and more complex chemical pathway involves oxidation of As+3 to As+5 via oxidation by the anodic emitted Fe+3 cations. Followed by the simple complexation chemical pathway involving additional Fe+3 cations to produce the anodic product of ferric arsenate:

$$2Fe^{+3}+H_3AsO_3+H_2O=2Fe^{+2}+H_3AsO_4+2H^+H_3AsO_4+Fe^{+3}=FeAsO_4(solid)+3H^+$$

For example, the method was used to treat a neutral drinking water containing 50 parts per billion arsenic. The contaminated drinking water was passed through an electric cell having an external electron moving force. Cell potential was 6 eV with a cell current of 50 amps providing an overall current density of 0.002 amps per square centimeter. The anode and cathode were made of iron separated by a distance of 4.5 mm. Subsequent GFAA analyses of the treated water revealed that the arsenic levels were less than 5 parts per billion. Additional testing for solubilized iron content revealed a concentration less than 15 parts per billion.

Therefore, the best mode for treating neutral drinking water containing arsenic is to employ an electric cell, utilizing an iron anode. A cell potential sufficient to cause complete oxidation of the anodic adsorbed iron cations ($Fe^{+3}$). The anode emitted ferric cations ($Fe^{+3}$) react with the in-migrating arsenic complex anions to form the insoluble precipitate of iron arsenate or to oxidize the in-migrating arsenic complex anions to arsenate to form the insoluble precipitate of iron arsenate.

This method utilizing an iron anode can remediate anionic arsenic compounds from aqueous systems with an optimal pH range of 5 to 9. The resulting anodic products of ferric arsenate and ferric hydroxide are of a finely divided and suspended solid form in the treated aqueous system. Separation of these solids is accomplished via coagulation or filtration and disposed of according to the toxicity leach characteristics of the resulting sludge, leaving purified water effluent.

The method thus provides a continuous electrolytic processing method to remove ions from neutral drinking waters anionic contaminates or arsenic by: a) constructing an electrolytic cell with a corroding iron anode and an inert cathode surrounding a reaction zone therebetween, b) applying the required electromotive force to precipitate the desired ion(s), and c) physically removing the precipitates from the drinking water.

DESCRIPTION OF THE ILLUSTRATED EMBODIMENTS

Figure 1:
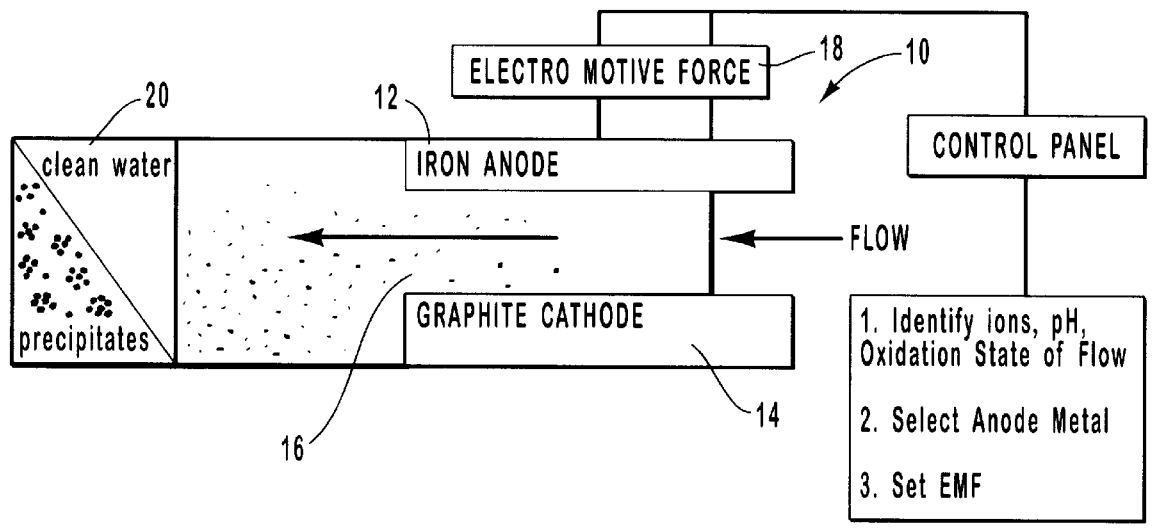
FIG. 1 illustrates a cross section of a continuous flow electrochemical cell employing an iron anode.

FIG. 1 illustrates a cross sectional view of an electrochemical continuous flow cell 10 employing a corroding iron anode 12 and an inert graphite cathode 14 used for anodic arsenic remediation. The anode 12 and cathode 14 surround a reaction zone 16 and are separated by a distance of approximately 4.5 mm. A control panel with ionic testing probes (not shown) is in contact with the inflows. The control panel is also associated with the electromotive force 18 driving the anode 12 and cathode 14 to control the desired voltage.

The reaction zone 16 allows a flow rate through the cell 10 of approximately 0.16 gallons per minute. Arsenic contaminated water is then passed through the reaction zone 16, and an electromotive force 18 of 5 eV and a current of 0.9 amps provide an overall current density of 0.03 amps to precipitate the desired ionic specie from the arsenic contaminated water. A filter 20 then separates the precipitates, leaving clean water.

Figure 2:
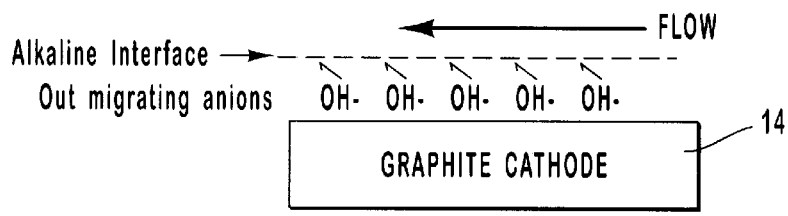
FIG. 2 illustrates the concentrated out migrating cations at the iron anode alkaline interface.

FIG. 2 illustrates the concentrated out migrating cations at the graphite cathode alkaline interface. Here a half-cell reaction occurs wherein oxygen and water react to form hydroxide producing the alkaline interface.

Figure 3:
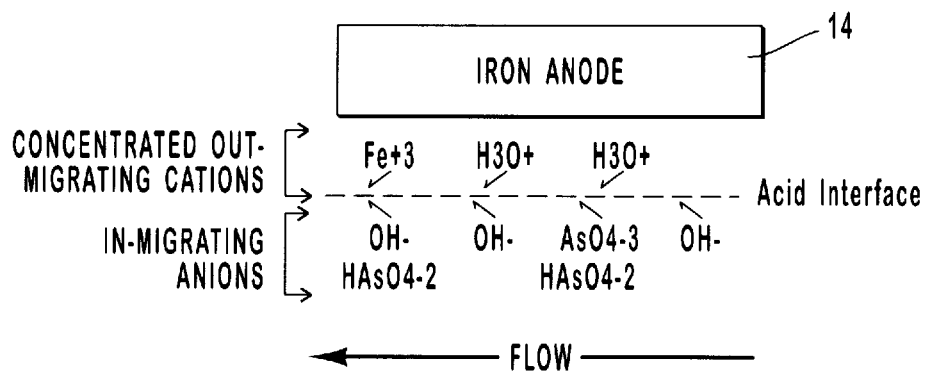
FIG. 3 illustrates the in-migrating anions at the anode of the electric cell shown in FIG. 1.
Figure 3:
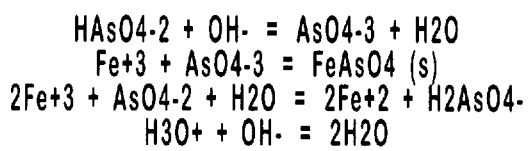
Figure 4:
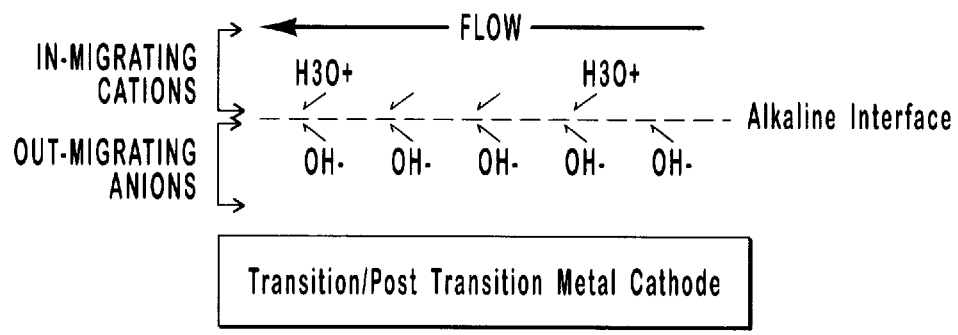
FIG. 4 illustrates the interface of the concentrated out migrating cations and the in-migrating anions at the alkaline interface of a transition/post transition metal cathode.
Figure 4:
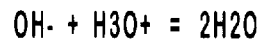

At the iron anode, the corroding anode forms an acid interface shown in FIG. 3. The concentrated out migrating ferric and acid cations meet the in-migrating hydroxide and arsenate anions to precipitate $FeAsO_4$, and $Fe(OH)_3$, which are then physically separated via a filter (not shown).

Although this specification has referred to the illustrated embodiments, it is not intended to restrict the scope of the appended claims. The claims themselves recite those features deemed essential to the invention.

I claim:

1. A water treatment method for electrochemically removing ionic arsenic contaminants from aqueous solutions having a pH in the range of about 5 to about 9, comprising:

a) constructing an electrolytic cell with an iron anode, and a cathode structured to form a reaction zone therebetween through which the contaminated aqueous solutions pass, b) applying a sufficient voltage between the anode and cathode to provide the required work to create adions on the surface of the anode to directly cause the formation of ferric arsenate precipitate to thereby insolubilize the arsenic ions in the contaminated aqueous solution, and c) physically removing the precipitated ferric arsenate from the contaminated aqueous solution.

2. A water treatment method according to claim 1, wherein the cathode is made of an inert material.

3. A water treatment method according to claim 1, wherein the contaminated aqueous solution is contaminated with $AsO_4^{-3}$, $AsO_3^{-3}$ compounds, and an iron anode is used for anodic arsenic remediation to oxidize the corroding anode from Fe to to form a finely divided/suspended solid water mixture of $FeAsO_4$, and $Fe(OH)_3$ precipitates, which are then physically separated.

4. A water treatment apparatus for electrochemically removing ionic arsenic contaminants from contaminated aqueous solutions having a pH in the range of about 5 to about 9, comprising:

a) an electrolytic cell with an iron anode, and a cathode structured to form a reaction zone therebetween through which the contaminated aqueous solutions are passed, b) a voltage source operably associated with the anode and cathode to provide the required work to create adions on the surface of the anode to directly cause the formation of ferric arsenate precipitate to thereby insolubilize the arsenic ions in the contaminated aqueous solutions, and c) means to physically remove the precipitated ions from the contaminated aqueous solutions.

5. A water treatment apparatus according to claim 4, wherein the cathode is made of an inert material.

6. A water treatment apparatus according to claim 5, wherein the cathode is made of a graphite material.

7. A water treatment apparatus according to claim 4, wherein the anode and cathode are spaced apart a distance of approximately 4.5 mm.

8. A water treatment apparatus according to claim 4, wherein the voltage as provided by the voltage source creates a voltage between the anode and cathode of five to six volts.

9. A water treatment apparatus according to claim 4, wherein the voltage source creates a current density between the anode and cathode of 0.002 to 0.03 amps per square centimeter.

10. A water treatment apparatus according to claim 4, wherein the means to physically remove the precipitated ions is a filter.

* * * * *